Figure 1:
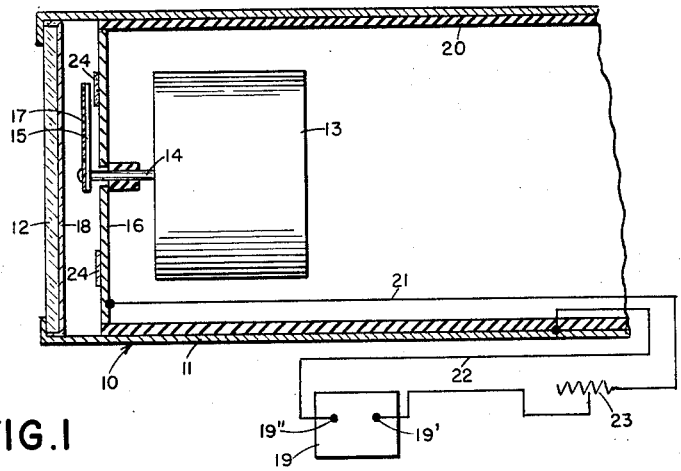

July 12, 1960 E. A. NEUGASS 2,945,145
INSTRUMENT LIGHTING DEVICES
Filed April 22, 1957

INVENTOR.
Edwin A. Neugass.
BY Maxwell E. Sparrow.
ATTORNEY.

United States Patent Office 2,945,145
Patented July 12, 1960

2,945,145

INSTRUMENT LIGHTING DEVICES

Edwin A. Neugass, Poteau, Okla.

Filed Apr. 22, 1957, Ser. No. 654,111

9 Claims. (Cl. 313—108)

This invention relates to instrument lighting devices and, more particularly, is directed to devices for illuminating the needle, pointer or other movable indicator of an aircraft instrument or the like.

Heretofore, it has been the usual practice to coat or paint the movable indicator of such instruments with phosphorescent pigments so that, after a period of exposure to light, the indicator will emit a glow in the dark. However, such residual phosphorescence is of insufficient duration to reliably illuminate the indicator for the long periods of time encountered in aircraft operation. Accordingly, it has been the common practice to further energize the phosphorescent pigments by casting ultra-violet light thereon, thereby to avoid reliance upon the residual effect resulting from energization by earlier exposure to light. However, it is necessary that the indicator be seen against a dark background and that the illumination thereof should be clearly defined so that the position of the indicator can be accurately read while the emission of stray light or leakage is avoided. The illumination of the indicator in the manner mentioned above has proved completely unsatisfactory, as the reflection of the ultra-violet light off the face of the instrument into the pilot's eyes causes serious loss of adaptation to the dark.

There have been numerous attempts to provide other systems for illuminating the pointer, needle or other movable indicator of aircraft instruments. For example, the indicator has been painted white and either red or white light has been cast thereon in order to render the latter visible in the dark. Various structural arrangements have been proposed for the purpose of casting light against the painted needle or movable indicator, such as, for example, a bulb mounted on the shaft or axis of the needle and shielded in order to direct light against the latter, a ring of plastic placed around the path of the needle and employed to pipe light and to emit the latter radially inward toward the needle, or a bulb mounted at the center of the cover glass of the instrument to cast light rearwardly against the needle or indicator. In another existing arrangement, the needle or indicator has been made of a light transmitting plastic and light has been directed against such needle or indicator from bulbs positioned behind the dial of the instrument or from bulbs disposed on the axis of the needle, either within the shaft of the needle or at the center of the instrument cover glass. However, such arrangements have been either too heavy, too delicate or produced too much stray or scattered light so that the needle did not stand out sharply enough when the intensity of illumination was brought down to the level at which the dark adaptation of the pilot's eyes is not seriously affected by the stray or scattered light.

Accordingly, it is an object of the present invention to provide devices for effecting the clear and sharp illumination of the needle, pointer or other movable indicator of aircraft instruments or the like without producing any stray or scattered light so that the needle, pointer or other movable indicator is clearly defined to permit accurate reading of the position thereof even when the intensity of illumination is reduced sufficiently to avoid any effect upon the dark adaptation of the viewer's eyes.

Another object is to provide illumination of the needle, pointer or other movable indicator of aircraft instruments and the like, which in no way interferes with the operation or movement of the illuminated indicator so that the accuracy of the response of the latter to the control impulse will not be affected.

A further object is to provide for the illumination of the needle, pointer or other movable indicator, and also for the illumination of the scale or index associated therewith in aircraft instruments and the like, and particularly, to provide an arrangement permitting independent control of the intensity of illumination of the needle, pointer or other movable indicator and of the scale or index, respectively, so that the illumination of the scale or index can be reduced or completely eliminated, as desired, without affecting the illumination of the needle, pointer or other movable indicator, thereby to permit the reading of the instruments by needle position, as is often the practice, without any distraction from illuminated scales or indices in the background.

In accordance with an aspect of the present invention, illumination of the needle, pointer or other movable indicator of aircraft instruments or the like is effected by providing the movable indicator with a coating of electro-luminescent materials which emit a glow when interposed in an electric field, and by creating an electric field of suitable voltage and frequency in which the coated needle moves.

Further, in accordance with the present invention, the electric field for energizing the electro-luminescent materials which either coat or impregnate the needle, pointer or other movable indicator is created between a transparent, mono-molecular metallic or other conductive coating on the back surface of the cover glass of the instrument and either the metal body of the needle, pointer or other movable indicator, in the case of an indicator which is merely coated with the electro-luminescent materials, or the metal dial of the instrument.

Further, in accordance with an aspect of the present invention, wherein the electric field for energizing the electro-luminescent materials on the needle is created between the mono-molecular conductive coating on the back face of the cover glass and the metal body of the indicator itself, the dial of the instrument is preferably formed of laminated panel material, for example, as disclosed in United States Letters Patent Number 2,518,726, issued August 15, 1950, to Shlenker, and such panel material, having openings in the front opaque surface thereof defining indicia, scales and the like, is internally illuminated, either in the manner disclosed in the above identified Patent Number 2,518,726 issued to Shlenker, or by electro-luminescent lighting plates, as in my co-pending application for United States Letters Patent, identified as Serial No. 594,167, filed June 27, 1956, now U.S. Patent No. 2,791,050, issued May 7, 1957.

Figure 2:
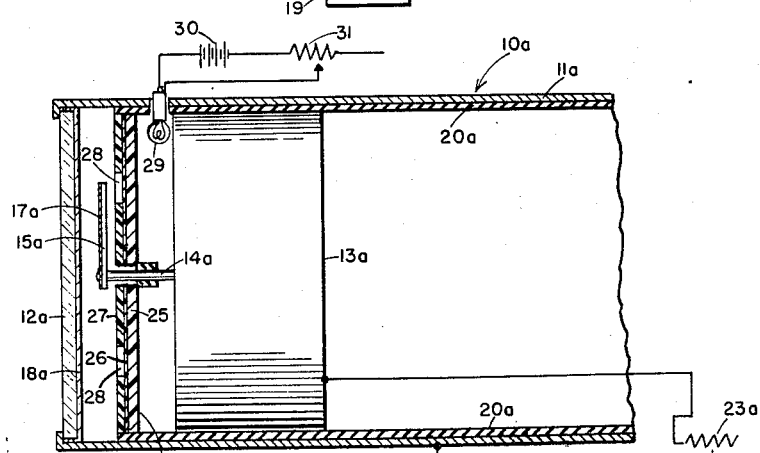
Figure 3:
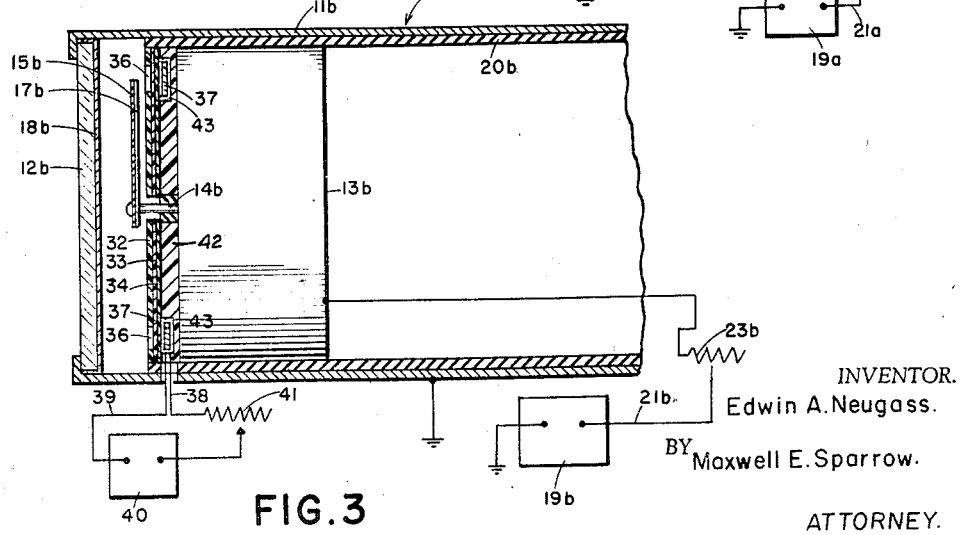

The above, and other objects, features and advantages of the present invention, will be apparent in the following detailed description of illustrative embodiments thereof which is to be read in connection with the accompanying drawings forming a part hereof, and wherein:

Fig. 1 is a longitudinal sectional view of an instrument having its needle, pointer or movable indicator illuminated in accordance with one embodiment of the present invention;

Fig. 2 is a view similar to that of Fig. 1, but showing the needle, pointer or other indicator of the instrument, as well as the dial thereof, illuminated in accordance with another embodiment of this invention; and Fig. 3 is a view similar to that of Fig. 1, but showing the needle, pointer or other movable indicator, as well as the dial of the instrument, illuminated in accordance with still another embodiment of this invention.

Referring to the drawings in detail, and initially to Fig. 1 thereof, it will be seen that an instrument having its needle, pointer or other movable indicator illuminated in accordance with a first embodiment of the present invention is there generally identified by the reference numeral 10 and includes a generally cylindrical metal case or housing 11. A cover glass 12 extends across, and closes, the front end of the case 11, and a mechanical or electrical drive device 13 of conventional construction is suitably mounted within the case 11 to drive a shaft 14, which carries a needle, pointer or other movable indicator 15, so that the position of the needle 15 will, at any time, correspond to conditions sensed by means, for example, an airspeed indicator, thermometer, or the like, associated with the drive device 13 for controlling the latter.

The instrument 10 further has a dial 16 which is disposed in back of the plane of movement of the needle or indicator 15 and provided with a suitably calibrated index or scale on its front face to cooperate with the needle or indicator in providing a quantitative indication of the related sensed condition.

In accordance with this invention, illumination of the needle, pointer or indicator 15 is achieved by providing a coating 17 of electro-luminescent materials thereon, or by forming the indicator of a plastic material which is impregnated with the electro-luminescent materials, and by creating an electric field in which the needle or indicator moves so that the electro-luminescent materials on or in the latter will be energized and emit a glow which effects glare-free illumination of the needle or indicator.

As disclosed in United States Letters Patent No. 2,566,349, issued Sept. 4, 1951, to Mager, the electro-luminescent materials on needle 15 may include phosphors, for example, a fired mixture comprising 75 percent of zinc sulphide and 25 percent of zinc oxide activated by small amounts of halogens, copper and/or lead, suspended in a solid dielectric, such as, clear acrylic resin, for example, methyl methacrylate.

In the embodiment of the invention illustrated in Fig. 1, the electric field for energizing the electro-luminescent coating 17 on needle 15 is created between a substantially transparent, mono-molecular conductive coating 18 on the back face of cover glass 12 and the dial 16 which is of metal. The conductive coating 18 may be formed of sputtered metal, for example, chromium or the like, and, by reason of its monomolecular thickness, such conductive coating will not appreciably decrease the transparency of the cover glass 12.

In order to create the desired electric field between coating 18 and metal dial 16, the coating and dial are electrically insulated from each other and are respectively connected to the opposite terminals of a suitable high frequency alternating current generator 19. For example, as shown in Fig. 1, an insulating sleeve 20 may be provided within casing 11 to electrically insulate the dial 16 and also the drive mechanism 13 from the casing, while the conductive coating 18 on cover glass 12 is continued over the peripheral edge thereof to provide a good electrical contact between casing 11 and conductive coating 18. The metal dial 16 is connected, by a conductor 21, to one terminal 19' of generator 19, while the casing 11 is connected, by a conductor 22, to the other terminal 19'' of the generator. Of course, if desired, the circuit for creating an electrical field between coating 18 and dial 16 may be completed through ground rather than through conductor 22, that is, in place of the conductor 22, both the casing 11 and the terminal 19'' may be connected to ground.

It has been found that, when the generator 19 impresses a suitable alternating voltage across the coating 18 and dial 16, for example, a voltage of 600 volts at 400 cycles per second, the phosphors in the electro-luminescent coating 17 are energized and, thereby, made to glow and provide clear and sharp illumination of the needle or indicator. Such illumination, in issuing directly from the needle or indicator, does not produce any stray or scattered light and clearly defines the needle or indicator so that the intensity of illumination can be reduced, by operation of controls associated with generator 19, for example, a variable resistor 23 interposed in the conductor 21, to decrease the voltage output and, hence, the strength of the electric field energizing the coating 17, until the illumination of the needle or indicator 15 does not appreciably affect the dark adaptation of the viewer's eyes.

In the illuminated instrument 10, the index or scale on the front face of metal dial 16 can be defined by suitably shaped deposits 24 of electro-luminescent materials which may have the some composition as has been described above in connection with the coating 17. Thus, when an electric field is created between the mono-molecular conductive coating 18 and the dial 16, the electro-luminescent deposits 24 will also be energized to emit a glow clearly defining the scale or index associated with the illuminated needle or indicator 15.

Many aircraft instruments have a sealed case containing an inert gas to prevent evaporation or drying out of the lubricants, and the instrument 10 may similarly have its case 11 sealed to contain an inert gas which increases the transfer of energy between the electrodes of the electric field, that is, between coating 18 and dial 16. Such inert gas may be of the kind usually employed in fluorescent lighting tubes.

It will be apparent that, in the instrument 10, manipulation of variable resistor 23 simultaneously varies the intensity of illumination of the needle 15 and of the associated scale or index on dial 16. However, many aircraft instruments are now provided with rotatable mountings so that the several instruments on a panel can be adjusted to cause their respective needles or indicators to point in the same direction, for example, vertically, when the related sensed conditons are all normal. Thus, frequently, pilots, flight engineers and the like are concerned only with the positions of the needles or indicators, and are interested in the relation of the needles to their associated scales or indexes only when the needles deviate from the prescribed, normal direction. Reading the instruments by needle position greatly eases the burden on the pilot, flight engineer or the like, confronted with the task of observing the deviation of any one of the instrument needles from a normal indication. When reading instruments by needle position, the associated scales or indices merely represent distractions that interfere with the complete utilization of the advantages inherent in this technique. Specifically, it would be desirable to normally illuminate only the needles or indicators of the instruments, so that such needles or indicators appear against dark backgrounds and the positions thereof are clearly disclosed, and to illuminate the scales or indices only when it becomes necesary to read or observe the positions of the needles with respect to the associated scales or indices.

However, in the instrument 10 described above with reference to Fig. 1, the coating 17 on needle or indicator 15 and the deposits 24 defining the scale or index on dial 16 are energized by the same electric field so that, any reduction in the intensity of illumination of the scale or index on the dial is accompanied by a corresponding reduction in the intensity of illumination of the indicator 15.

Accordingly, in another instrument embodying the present invention and generally identified by the reference numeral 10a in Fig. 2, provision is made for independently illuminating the needle or indicator 15a and the associated scale or index on the dial 16a. The several parts of instrument 10a are identified by the same reference numerals employed in connection with the corresponding parts of instrument 10, but with the letter "a" appended thereto. Thus, the case 11a of instrument 10a is closed, at its front end, by a cover glass 12a having a mono-molecular, transparent conductive coating 18a on its back face; while the drive mechanism 13a for the shaft 14a carrying needle 15a is insulated from case 11a by a sleeve 20a.

In order to illuminate the needle 15a, a coating 17a of electro-luminescent materials is applied thereto, and an electric field is created between the conductive coating 18a and the metal body of needle 15a. The necessary alternating voltage may be transmitted to coating 18a and needle 15a by connecting one terminal of a suitable generator 19a to the drive mechanism 13a, by way of a conductor 21a, while the case 11a and the other terminal of generator 19a are both grounded. It has been found that the drive mechanism 13a and shaft 14a can be employed to transmit the alternating voltage to needle 15a, as the small currents involved in the creation of the necessary electric field have no physical effect upon the drive mechanism. Further, a variable resistor 23a may be interposed in the conductor 21a to permit variation of the strength of the electric field and, hence, of the intensity of the illumination provided by the energized electro-luminescent materials of coating 17a.

In the instrument 10a, the dial 16a is illuminated independently of the needle 15a and, for this purpose, may be formed of laminated panel material of the kind disclosed in United States Letters Patent No. 2,518,726, issued August 15, 1950, to Shlenker. Thus, dial 16a may include a body or core sheet 25 of clear light transmitting, preferably plastic, material, such as, for example, methyl methacrylate, a layer 26 of translucent, preferably white, plastic material, such as, for example, polyvinyl or vinyl resins or polymers or copolymers thereof, superposed on, and bonded to, the front face of core sheet 25, and a layer 27 of opaque, preferably dark colored, plastic material of the class specified in connection with layer 26 which is superposed on, and bonded to the latter. The opaque front or outer layer 27 has openings 28 therein exposing the underlying portions of the translucent layer 26 and shaped to define the elements of the scale or index associated with needle 15a. Thus, when viewed in daylight or under other ambient illumination, the scale or index on dial 16a is defined by the color contrast between the exposed portions of the white translucent layer 26 and the surrounding areas of the relatively dark colored opaque layer 27.

In order to provide artificial illumination of the scale or index on dial 16a, light is admitted to the core or body 25 thereof, for example, from a light bulb 29 or from an electroluminescent lighting plate, for example, as in United States Letters Patent No. 2,566,349 to Mager, which is mounted behind the dial 16a and such light is transmitted by core 25 to trans-illuminate the translucent sheet or layer 26 at the openings 28 in the opaque outer sheet 27. The light bulb 29 or other light source may be energized by a suitable electric circuit including a battery 30 and having a variable resistor 31 interposed therein so that, by manipulating the latter, the intensity of illumination of the dial 16a may be controlled independently of the intensity of illumination of the needle 15a, thereby to permit the relatively bright illumination of the latter while the illumination of the associated scale or index is reduced or completely eliminated to facilitate "needle position" reading of the instrument.

In Fig. 3 of the drawings, another instrument embodying the present invention and permitting individual control of the intensity of illumination of the needle or indicator and of the associated scale or index is generally identified by the reference numeral 10b. The parts of the instrument 10b are identified by the same reference numerals used in connection with the corresponding parts of instrument 10, but with the letter "b" appended thereto. Thus, the instrument 10b includes a case 11b which is closed, at its front end, by a cover glass 12b having a transparent, mono-molecular conductive coating 18b on its back face. The drive mechanism 13b for the shaft 14b of needle 15b is mounted within case 11b and insulated from the latter by a sleeve 20b, while the coating 17b of electro-luminescent materials on the needle 15b is energized to illuminate the latter by creating a suitable electric field between the conductive coating 18b and the metal body of needle 15b. As in the instrument 10a of Fig. 2, the above electric field is produced by connecting one terminal of a generator 19b to the drive mechanism 13b, for example, through a conductor 21b having a variable resistor 23b interposed therein, while the other terminal of the generator and the case 11b are both connected to the ground for completing the circuit through the latter.

In the instrument 10b, the dial 16b disposed in back of the plane of movement of needle 15b is formed of laminated panel material of a type disclosed in detail in my co-pending application for United States Letters Patent Ser. No. 594,167, filed June 27, 1956, and includes a front layer 32 of a black opaque material, which is preferably a plastic, for example of the class of polyvinyl or vinyl resins or materials, their polymers or copolymers, a layer 33 of white, translucent material underlying the front opaque layer 32 and preferably formed of a clear plastic material having a dispersion of relatively large particles therein, as in my prior United States Letters Patent No. 2,693,656, issued November 9, 1954, and a relatively thick sheet 34 of light transmitting material, for example, methyl methacrylate, which is disposed in back of layer 33 and may have a coating of suitably colored, for example, red, fluorescent dye on its back surface.

The scale or index associated with needle 15b is defined on dial 16b by suitably shaped and positioned openings 36 in the opaque front layer 32 exposing the underlying portions of translucent layer 33. By reason of the sharp color contrast between the white translucent layer 33 exposed at the openings 36 and the black or dark colored opaque layer 32 surrounding such openings, the corresponding markings or indicia of the scale are clearly visible under ambient illumination.

In order to effect artificial, glare-free illumination of the scale or index on dial 16b, the latter further includes one or more electro-luminescent lighting plates 37 disposed in back of the clear sheet 34 and extending over those areas of the dial having the marking or indicia defining openings 36 therein. Each of the electro-luminescent lighting plates or devicts 37 may be of the kind disclosed in United States Letters Patent No. 2,566,349, issued September 4, 1951, to Mager, and wherein, a plate of glass or other transparent material has a transparent conductive coating on one side thereof, and a phosphor, which may be a fired mixture of 75 percent zinc sulphide and 25 percent zinc oxide activated by small amounts of halogens, copper and/or lead, suspended in a solid dielectric sheet is sandwiched between the conductive coating of the glass and a metal sheet so that, when an alternating voltage is applied between the metal sheet and conductive coating, the phosphor glows and provides light issuing through the glass sheet. Alternatively, each electro-luminescent lighting plate or device 37 may be in the form disclosed in United States Letters Patent No. 2,684,450, issued July 20, 1954, to Mager and Lowry, and wherein two intermeshed metallic grids are applied to a face of a supporting plate and insulated from each other, and a phosphor, which may have the composition indicated above, is applied over and between the intermeshed metallic grids on the supporting plate to be energized and made to glow by an electric field created between the grids when an alternating voltage is impressed on the latter.

As seen in Fig. 3, each electro-luminescent lighting plate or device 37 is connected, as by conductors 38 and 39, to the opposite terminals of a suitable alternating voltage generator 40, and a variable resistor 41 or the like, is interposed in the conductor 38 to permit variation of the strength of the electric field and, hence, of the intensity of the light emitted from the lighting plate or plates.

The dial 16b is completed by a backing sheet 42 of insulating material, for example, of methyl methacrylate, which is applied against the back surface of light transmitting sheet 34 and has a suitable recess 43 formed in its front surface to accommodate each of the electro-luminescent lighting plates 37. Preferably, the recesses 43 are larger, in all directions, than the related lighting plates 37 so that a clearance exists around the latter, thereby to avoid the development of internal stresses within the dial as a result of differences in the coefficients of thermal expansion of the lighting plates and of the laminated dial structure, respectively.

In producing the dial 16b, the layers 32 and 33 and the sheet 34 may be initially joined together, either by adhesive or by heat and pressure, to form a lamination, and then the backing sheet 42, with each lighting plate 37 in its related recess 43 and the necessary electrical conductors either printed on the front face of sheet 42 or positioned in suitable grooves therein, is joined to the back of the lamination, either by adhesive, heat and pressure or mechanical means, such as, screws and the like.

When the lighting plate 37 is energized, light is emitted therefrom into the sheet 34 to uniformly trans-illuminate the related area or portion of translucent layer 33 exposed at the openings 36 in front opaque layer 32. Thus, the index or scale on dial 16b may be uniformly illuminated with a controlled intensity and, if desired, the needle 15b can be exclusively illuminated to facilitate the reading of the instrument by "needle position" without the usual background distraction of the illuminated scale or index on the dial.

Although the present invention has been described above with reference to the illumination of instruments of the kind having a dial and a needle or pointer which moves angularly about a fixed axis in relation to the dial for indicating a sensed condition, it should be understood that the principles embodying the invention can be applied with equal convenience and advantage to other known instruments, for example, aircraft turn and bank instruments, artificial horizons and compasses, to mention a few.

Further, although illustrative embodiments of this invention have been described in detail herein with reference to the accompanying drawings, it is to be understood that the invention is not limited to such embodiments, and that various changes and modifications may be effected therein without departing from the scope or spirit of the invention, except as defined in the appended claims.

What is claimed is:

1. In an indicating device; the combination of a dial having indicia thereon, an indicator in front of said dial and movable relative to the latter, a cover glass in front of said indicator, said indicator containing electro-luminescent materials, and means operative to produce an electric field across the path of movement of said indicator and including a transparent conductive coating on the back surface of said cover glass acting as an electrode for the electric field so that said electro-luminescent materials are thereby energized to glow and illuminate said indicator.

2. In an indicating device; the combination of a dial having indicia thereon, an indicator in front of said dial and movable relative to the latter, a cover glass in front of said indicator, a coating on said indicator containing electro-luminescent materials, means operative to produce an electric field across the path of movement of said indicator and including a transparent conductive coating on the back surface of said cover glass acting as an electrode for the electric field so that said electro-luminescent materials are thereby energized to glow and illuminate said indicator, and independently controllable means for illuminating said indicia of the dial so that the intensity of illumination of said indicia can be reduced independently of the intensity of illumination of said indicator to facilitate viewing of the position of the latter without distraction by said indicia.

3. In an indicating device; the combination of a metal dial, an indicator in front of said dial and movable relative to the latter, a cover glass in front of said indicator and having a transparent conductive coating on its back face, a coating on said indicator containing electro-luminescent materials, and means for applying an alternating voltage across said conductive coating and said metal dial to produce an electric field through which said indicator is movable so that said electro-luminescent materials are thereby energized and made to glow for illuminating said indicator.

4. In an indicating device; the combination of a metal dial having deposits on its front face containing electro-luminescent materials and defining indicia on the dial, an indicator movable in front of said dial and having a coating containing electro-luminescent materials, a cover glass in front of said indicator and having a transparent conductive coating on its back surface, and means for applying an alternating voltage across said conductive coating and metal dial to produce an electric field therebetween for energizing said electro-luminescent materials, whereby the latter glow and illuminate said indicia and said indicator.

5. In an indicating device; the combination of a dial having indicia thereon, an indicator movable in front of said dial and having a metal body and a coating containing electro-luminescent materials on said body, a cover glass in front of said indicator and having a substantially transparent, conductive coating on its back face, and means for applying an alternating voltage across said conductive coating and said metal body to produce an electric field therebetween for energizing said electro-luminescent materials so that the latter glow and, thereby, illuminate said indicator.

6. In an indicating device; the combination of a dial having indicia thereon, an indicator movable in front of said dial and having a metal body and a coating containing electro-luminescent materials on said body, a cover glass in front of said indicator and having a substantially transparent, conductive coating on its back face, means for applying an alternating voltage across said conductive coating and said metal body to produce an electric field therebetween for energizing said electro-luminescent materials so that the latter glow and, thereby, illuminate said indicator, and independently controllable means for illuminating said indicia of the dial so that the intensity of illumination of said indicia can be reduced independently of the intensity of illumination of the indicator to facilitate viewing of the position of the latter without distraction by said indicia.

7. In an indicating device; the combination of a dial including a sheet of light transmitting material, a translucent, light colored layer superposed on the front surface of said sheet and an opaque, dark colored layer superposed on said translucent layer and having openings therein to expose portions of said translucent layer defining indicia on said dial, means for admitting light to said sheet for transmission by the latter to trans-illuminate said translucent layer at said openings and, thereby, to illuminate said indicia, an indicator movable in front of said dial and having a metal body and a coating containing electro-luminescent materials on said body, a cover glass in front of said indicator and having a substantially transparent, conductive coating on its back face, and means for applying an alternating voltage across said body and conductive coating to produce an electric field therebetween for energizing said electro-luminescent materials and causing the latter to glow and illuminate said indicator.

8. In an indicating device; the combination as in claim 7, wherein said means for admitting light to said sheet includes at least one incandescent light bulb disposed in back of said light transmitting sheet for emitting light into the back surface of said sheet.

9. In an indicating device; the combination as in claim 7, wherein said means for admitting light to said sheet includes at least one electro-luminescent lighting plate disposed in back of said sheet of light transmitting material, and means for energizing said plate independently of said electric field energizing the electro-luminescent materials on said indicator so that the indicator can be illuminated independently of the indicia on the dial to facilitate viewing of the position of the indicator without distraction from said indicia.

References Cited in the file of this patent

UNITED STATES PATENTS

| | | |
|---|---|---|
| 2,246,741 | Loen | June 24, 1941 |
| 2,428,792 | Evans | Oct. 14, 1947 |
| 2,542,021 | Fox | Feb. 20, 1951 |
| 2,595,973 | Neugass | May 6, 1952 |
| 2,773,216 | Edmonds | Dec. 4, 1956 |
| 2,790,936 | Bell | Apr. 30, 1957 |
| 2,791,723 | Nagy et al. | May 7, 1957 |
| 2,809,316 | Jeges | Oct. 8, 1957 |

OTHER REFERENCES

"Electroluminescence and Its Applications," by J. Bowtell, Journal I.E.E., page 454 et seq., August 1957.

"Electroluminescence—A New Method of Producing Light," by Byne-Mager-Jerome, Illuminating Eng., p. 688 et. seq., November 1950.